(12) United States Patent
Lee et al.

(10) Patent No.: US 9,049,643 B2
(45) Date of Patent: Jun. 2, 2015

(54) METHOD AND DEVICE FOR TRANSMITTING/RECEIVING DATA IN WIRELESS ACCESS SYSTEM SUPPORTING MULTI-RADIO ACCESS TECHNOLOGY

(75) Inventors: Eunjong Lee, Anyang-si (KR);
Heejeong Cho, Anyang-si (KR);
Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 13/811,660

(22) PCT Filed: Jul. 22, 2011

(86) PCT No.: PCT/KR2011/005448
§ 371 (c)(1),
(2), (4) Date: Jan. 22, 2013

(87) PCT Pub. No.: WO2012/011788
PCT Pub. Date: Jan. 26, 2012

(65) Prior Publication Data
US 2013/0130681 A1    May 23, 2013

Related U.S. Application Data

(60) Provisional application No. 61/366,896, filed on Jul. 22, 2010, provisional application No. 61/368,240, filed on Jul. 27, 2010.

(51) Int. Cl.
*H04W 88/10* (2009.01)
*H04W 48/10* (2009.01)
(Continued)

(52) U.S. Cl.
CPC .............. *H04W 48/10* (2013.01); *H04W 48/18* (2013.01); *H04W 76/025* (2013.01); *H04W 88/06* (2013.01); *H04W 76/026* (2013.01)

(58) Field of Classification Search
USPC .................. 455/436–444, 434, 435.1, 435.2; 370/331, 332
See application file for complete search history.

(56) References Cited

U.S. PATENT DOCUMENTS 8,291,625 B2 * 10/2012 Lee et al. .......................... 37/331
8,457,070 B2 * 6/2013 Park et al. ....................... 370/331
(Continued)

OTHER PUBLICATIONS

Kim, et al., "Contribution for Hierarchical Network Study Report," IEEE 802.16 Broadband Wireless Access Working Group, IEEE C802.16ppc-10/0044, Jul. 2010, 9 pages.
(Continued)

*Primary Examiner* — Kashif Siddiqui
*Assistant Examiner* — Farideh Madani
(74) *Attorney, Agent, or Firm* — Lee, Hong, Degerman, Kang & Waimey (57) ABSTRACT

The present invention relates to a method by which a terminal transmits/receives data to/from a first base station supporting a first radio access technology and a second base station supporting a second radio access technology in a wireless access system supporting multi-radio access technology (multi-RAT), the method comprising the steps of: executing an initial network entry to the first base station; executing a multi-RAT capability negotiation with the first base station to exchange information needed to access the second base station; a step for executing a scanning on at least one second base station included in the coverage of the first base station, on the basis of the information received from the first base station through the multi-RAT capability negotiation step; executing an access to one second base station of said at least one second base station; and simultaneously transmitting/receiving data to/from the first base station and the second base station accessed through the access step, wherein the step of executing a scanning comprises a step of receiving sage for commanding the scanning of said at least one second base station, and a step of executing a scanning of said at least one second base station.

11 Claims, 6 Drawing Sheets

(51) Int. Cl.
*H04W 76/02* (2009.01)
*H04W 48/18* (2009.01)
*H04W 88/06* (2009.01)

(56) References Cited

U.S. PATENT DOCUMENTS

2007/0115796 A1* 5/2007 Jeong et al. .............. 370/203
2009/0180451 A1  7/2009 Alpert et al.
2010/0111214 A1  5/2010 Chin et al.
2011/0014919 A1* 1/2011 Otte et al. .............. 455/442

OTHER PUBLICATIONS

Kim, et al., "Study Report on Hierarchical Networks (Working document)," IEEE 802.16 Broadband Wireless Access Working Group, IEEE 802.16ppc-10/0008, Jul. 2010, 14 pages. (relevant portion: section 2.2 and Figs. 5-6).

PCT International Application No. PCT/KR2011/005448, Written Opinion of the International Searching Authority, or Declaration dated Feb. 6, 2012, 14 pages.

\* cited by examiner

METHOD AND DEVICE FOR TRANSMITTING/RECEIVING DATA IN WIRELESS ACCESS SYSTEM SUPPORTING MULTI-RADIO ACCESS TECHNOLOGY

CROSS-REFERENCE TO RELATED APPLICATIONS

This application is the National Stage filing under 35 U.S.C. 371 of International Application No. PCT/KR2011/005448, filed on Jul. 22, 2011, which claims the benefit of U.S. Provisional Application Ser. No. 61/366,896, filed on Jul. 22, 2010, and U.S. Provisional Application Ser. No. 61/368,240, filed on Jul. 27, 2010, the contents of which are all hereby incorporated by reference herein in their entirety.

TECHNICAL FIELD

The present invention relates to a radio access system supporting a multi-radio access technology (RAT), and more particularly, to a method and device for transmitting and receiving data through two or more heterogeneous networks.

BACKGROUND ART

Conventionally, in a wireless communication environment supporting two or more heterogeneous networks, even if a mobile station (MS) has multi radio access technology (RAT) capability, the MS cannot simultaneously access multi-RAT networks, and thus, the MS cannot simultaneously transmit and receive data to and from two or more heterogeneous networks.

That is, an MS supporting conventional multi-RAT accesses any one RAT network based on switching, and transmits and receives data through one network. Thus, when the MS having the multi-RAT capability transmits and receives data through a predetermined network and then transmits and receives data to and from another network different from the predetermined network, transmission and reception of data to and from any one network are stopped.

Thus, conventionally, an MS having capability for supporting two or more heterogeneous networks can perform communication through different networks. However, since the MS operates based on simple switching, the MS has limited efficiency.

In addition, different networks operate independently of each other, and thus, the MS operates inefficiently in terms of overall flow management thereof.

DISCLOSURE

Technical Problem

An object of the present invention devised to solve the problem lies in defining an overall procedure in which a mobile station (MS) having multi radio access technology (RAT) capability simultaneously transmits and receives data to and from each network through two or more heterogeneous networks.

Another object of the present invention devised to solve the problem lies in defining a multi-RAT capability negotiation procedure between a base station that performs an overall control procedure and the MS having multi-RAT capability in order to simultaneously transmit and receive data through two or more networks.

When a multi-RAT MS receives instructions for access to a secondary system as well as a primary system which the multi-RAT MS currently accesses, it is required to select a most appropriate secondary system (for example, a system, a signal of which has highest intensity, or a system preferred by the multi-RAT MS) at a current position.

However, although a system that prioritizes access setting based on the base station may help the base station to select and set the secondary system of the multi-RAT MS in a multi-RAT environment, the base station cannot correctly recognize signal intensity and information of a peripheral secondary system of the multi-RAT MS, and thus, the base station cannot efficiently set access to the secondary system of the multi-RAT MS.

Thus, an object of the present invention devised to solve the problem lies in a scanning procedure on the secondary system of the multi-RAT MS, which includes transmitting scanning information about peripheral secondary systems of the multi-RAT MS to the base station to the multi-RAT MS.

Technical Solution

The object of the present invention can be achieved by providing a method for transmitting and receiving data to and from a primary base station supporting a primary radio access technology (RAT) and a secondary base station supporting a secondary RAT by a mobile station (MS) in a radio access system supporting a multi-RAT, the method including executing an initial network entry procedure to the primary base station, performing a multi-RAT capability negotiation procedure with the primary base station in order to exchange information required for access to the secondary base station, performing a scanning procedure on at least one secondary base station within coverage of the primary base station based on information received from the primary base station through the multi-RAT capability negotiation procedure, performing an access procedure to any one secondary base station of the at least one secondary base station, and simultaneously transmitting and receiving data to and from the primary base station and the secondary base station, the secondary base station being accessed through the access procedure, wherein the performing of the scanning procedure includes receiving a multi-RAT scan command message for request of the scanning procedure of the at least one secondary base station from the primary base station, and performing the scanning procedure on the at least one secondary base station.

The performing of the scanning procedure may further include transmitting a multi-RAT scan report message for report of a result of the scanning procedure to the primary base station.

The method may further include receiving information about a secondary base station selected based on the multi-RAT scan report message, from the primary base station.

The performing of the scanning procedure may be performed periodically, in an event-triggered manner, or only once.

The primary RAT may be a broadband RAT, and the secondary RAT may be a local area RAT.

The broadband RAT may be a RAT supporting 802.16, and the local area RAT may be a RAT supporting 802.11.

The primary base station and the secondary base station may be connected to each other in a wired or wireless manner.

A type of a data flow transmitted and received through the secondary base station may be determined according to an instruction of the primary base station.

The multi-RAT scan command message may include at least one of subsystem identification (SSID) of access points (APs) in the vicinity of the MS, beacon transmission period of the APs, and scanning interval information.

The multi-RAT scan report message may include a received signal strength indicator (RSSI) of the AP and/or preferred AP information of the MS.

In addition, the object of the present invention can be achieved by providing a mobile station (MS) for transmitting and receiving data to and from a primary base station supporting a primary radio access technology (RAT) and a secondary base station supporting a secondary RAT in a radio access system supporting a multi-RAT, the MS including a radio frequency (RF) unit for transmitting and receiving a RF signal to and from an external source, and a controller connected to the RF unit, wherein the controller controls the MS to execute an initial network entry procedure to the primary base station, controls the MS to perform a multi-RAT capability negotiation procedure with the primary base station in order to exchange information required for access to the secondary base station, controls the RF unit to receive a multi-RAT scan command message for request of a scanning procedure on at least one secondary base station within coverage of the primary base station based on information received from the primary base station through the multi-RAT capability negotiation procedure, controls the MS to perform the scanning procedure on the at least one secondary base station, controls the MS to perform an access procedure on any one secondary base station of the at least one secondary base station, and controls the RF unit to simultaneously transmit and receive data to and from the primary base station and the secondary base station, the secondary base station being accessed through the access procedure.

Advantageous Effects

The present invention defines a procedure in which a multi radio access technology (RAT) mobile station (MS) simultaneously transmits and receives data to and from each network through two or more heterogeneous networks, thereby reducing overhead of data transfer in a specific network.

The present invention defines an initial network entry procedure in which information indicating that the MS has multi-RAT capability is transmitted to a base station, and thus, the base station may easily recognizes whether a corresponding MS has multi-RAT capability.

The present invention defines a multi-RAT capability negotiation procedure between the multi-RAT MS and a base station of a primary system, and thus, the primary system may request the multi-RAT MS to efficiently use a secondary system appropriate to capability of the multi-RAT MS.

In addition, the present invention defines a scanning procedure on the secondary system of the multi-RAT MS, which includes transmitting scanning information about secondary systems in the vicinity of the multi-RAT MS to the base station by the multi-RAT MS, and thus, the primary system managing the secondary system may efficiently set access of the multi-RAT MS to the secondary system.

BEST MODE

The following technologies may be used in various wireless communication systems such as code division multiple access (CDMA), frequency division multiple access (FDMA), time division multiple access (TDMA), orthogonal frequency division multiple access (OFDMA), and single carrier frequency division multiple access (SC-FDMA).

CDMA may be implemented as a radio technology such as universal terrestrial radio access (UTRA) or CDMA2000. TDMA may be implemented as a radio technology such as global system for mobile communications (GSM), general packet radio service (GPRS), and enhanced data rates for GSM evolution (EDGE). OFDMA may be implemented as radio technology such as institute of electrical and electronics engineers (IEEE) 802.11 (Wi-Fi), IEEE 802.16 (WiMAX), IEEE 802.20, and evolved-UTRA (E-UTRA). IEEE 802.16m is an evolved version of IEEE 802.16e and provides backward compatibility with a system based on IEEE 802.16e.

UTRAN is a part of universal mobile telecommunication system (UMTS). 3rd generation partnership project (3GPP) long term evolution (LTE) is a part of evolved UMTS (E-UMTS) using evolved-UMTS terrestrial radio access (E-UTRA) and employs OFDMA on downlink and SC-FDMA on uplink. LTE-advanced (LTE-A) is an evolved version of 3GPP LTE.

Hereinafter, the present invention will be described in detail by explaining exemplary embodiments of the invention with reference to the accompanying drawings. The same reference numerals in the drawings denote like elements, and a repeated explanation thereof will not be given. In the description of the present invention, certain detailed explanations of the related art are omitted when it is deemed that they may unnecessarily obscure the essence of the invention. The features of the present invention will be more clearly understood from the accompanying drawings and should not be limited by the accompanying drawings. It is to be appreciated that all changes, equivalents, and substitutes that do not depart from the spirit and technical scope of the present invention are encompassed in addition to the accompanying drawings in the present invention.

Hereinafter, a method in which a mobile station (MS) accesses two or more heterogeneous networks (or multi radio access technology (RAT) networks) and simultaneously transmits and receives data through the networks in a multi-RAT network proposed in the present invention will be described.

The multi-RAT network proposed in the present invention will be described below.

Figure 1A:
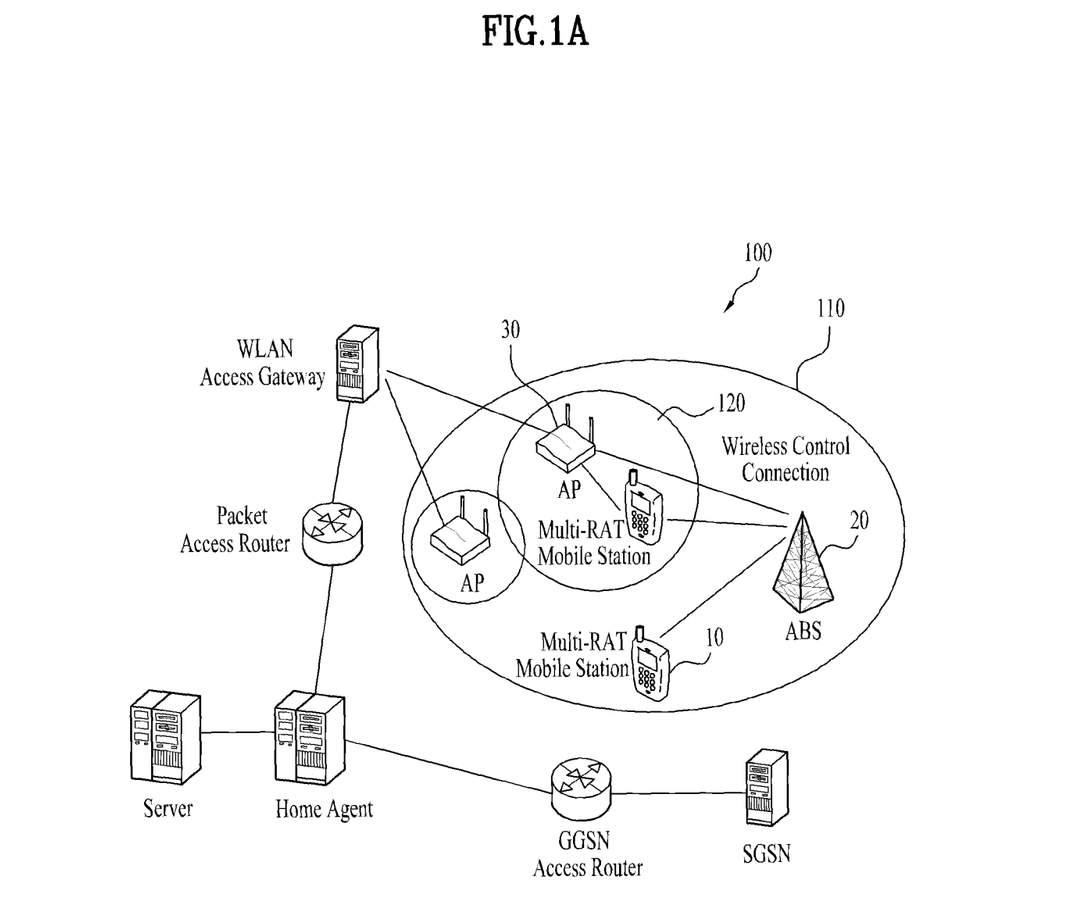
FIGS. 1A and 1B are diagrams for showing concepts of multi radio access technology (RAT) networks to which an embodiment of the present invention can be applied.
Figure 1B:
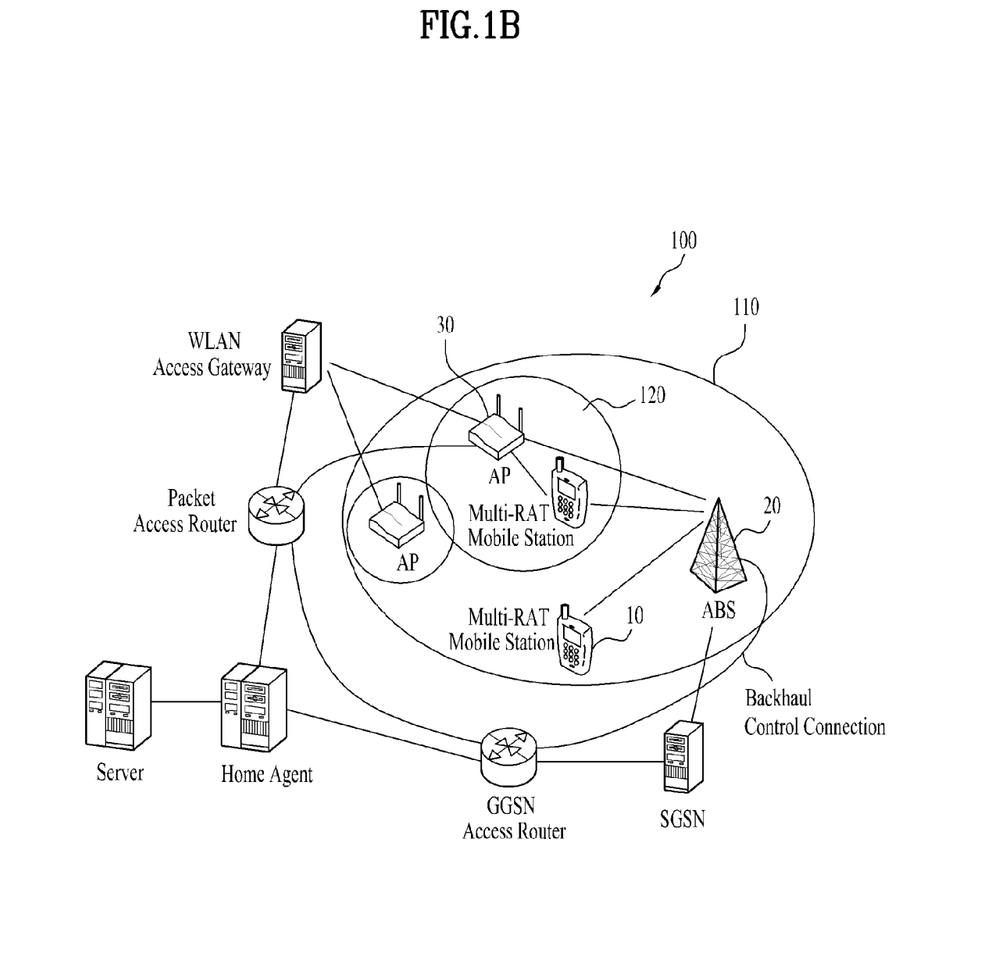

FIGS. 1A and 1B are diagrams showing concepts of multi-RAT networks to which an embodiment of the present invention can be applied.

The multi-RAT network refers to a wireless communication environment in which two or more heterogeneous networks coexist and an MS accesses the heterogeneous networks to simultaneously perform communication.

Here, an MS for simultaneously communicating with two or more heterogeneous networks may also be referred to as a 'multi-RAT MS' or a 'multi system MS'.

With regard to a predetermined network, a heterogeneous network (or a heterogeneous system) refers to a network using a different communication method from a communication method used in the predetermined network.

For example, a wireless fidelity (WiFi) network and a worldwide interoperability for microwave access (WiMAX) network as an example of a mobile communication system correspond to heterogeneous networks.

RAT is a technology type used in radio access. Examples of RAT may include GSM/EDGE radio access network (GERAN), UMTS terrestrial radio access network (UTRAN), evolved-UMTS terrestrial radio access network (E-UTRAN), WiMAX, LTE(-A), and WiFi. That is, GERAN, UTRAN, E-UTRAN, WiMAX, and/or WiFi coexist in the same area.

As shown in FIG. 1, a multi-RAT network 100 may include a primary system 110 and a secondary system 120.

Here, the primary system 110 and the secondary system 120 may be referred to as a primary network and a secondary network, respectively. The primary system 110 may include a multi-RAT MS 10, a base station 20, and the secondary system 120. The secondary system 120 may include the multi-RAT MS 10 and an access point (AP) 30.

The primary system may have coverage of a wide range and may be a mobile communication system. For example, the primary system may be a WiMAX or LTE(-A) system. In addition, the primary system is always in a predetermined status with respect to the multi-RAT MS. That is, the primary system maintains an active status, a sleep mode status, or an idle mode status with respect to the multi-RAT MS.

The secondary system may have coverage of a small range and may be a wireless local area network (WLAN) system. For example, the secondary system may be a Wi-Fi system. That is, the secondary system may be added to or deleted from the multi-RAT network depending on the cases. In addition, the secondary system may be used for data communication which mainly requires a higher bandwidth (BW). Thus, mapping may be performed on a specific flow (quality of service (QoS)) in order to use the secondary system.

Herein, the AP as an example of the secondary system may operate in the same way as an MS capable of communicating with the primary system.

In addition, the primary system and the secondary system are connected to each other in a wired or wireless manner in the multi-RAT network. That is, a base station of the primary system and a base station of the secondary system may be connected to each other through a backbone network in a wired manner (FIG. 1B) or may be connected to each other in a wireless manner (FIG. 1A).

Hereinafter, for convenience of description, it is assumed that the primary system is a WiMAX system and the secondary system is a Wi-Fi system unless there is no different disclosure. Accordingly, a base station corresponding to the primary system will be referred to as a 'base station' and a base station corresponding to the secondary system will be referred to as an 'AP'. In addition, hereinafter, access to the primary system may have the same meaning as access to the base station of the primary system and access to the secondary system may have the same meaning as access to the AP.

Figure 2:
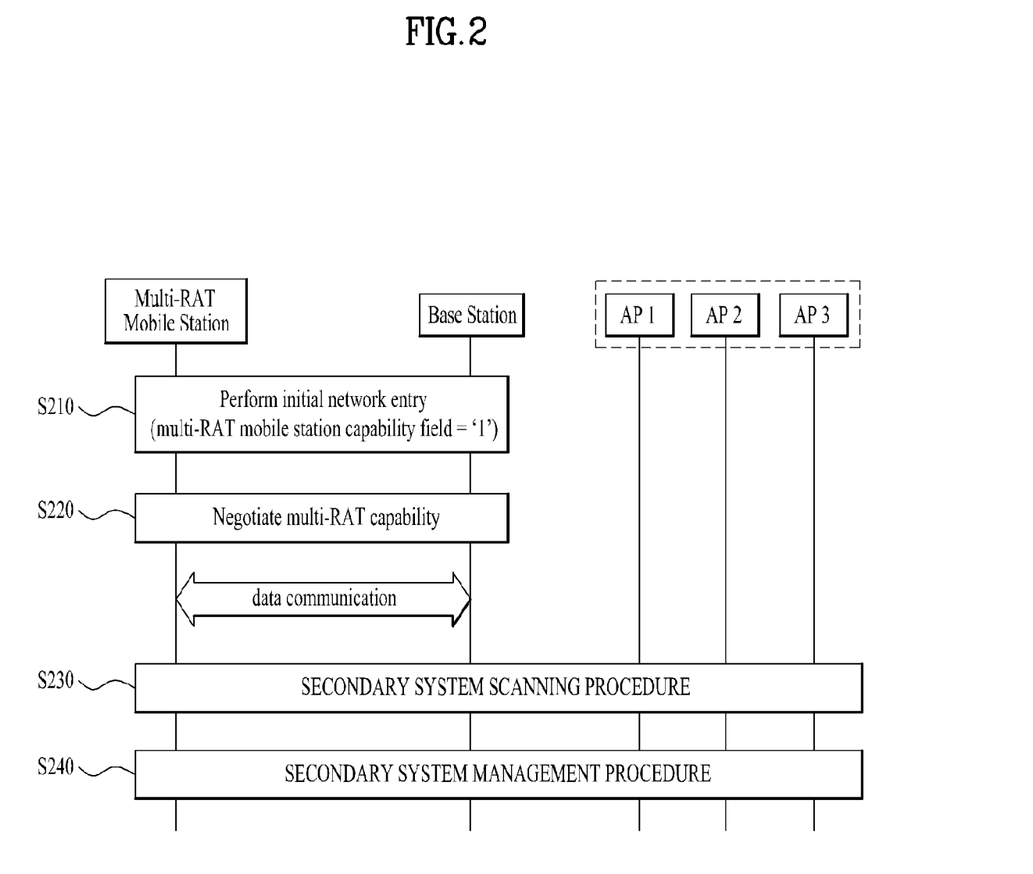
FIG. 2 is a flowchart of a method of transmitting and receiving data by a multi-RAT mobile station (MS) through a primary system and a secondary system according to an embodiment of the present invention.

FIG. 2 is a flowchart of a method of transmitting and receiving data by a multi-RAT MS through a primary system and a secondary system according to an embodiment of the present invention.

Referring to FIG. 2, the multi-RAT MS executes an initial network entry procedure to a base station (S210).

The multi-RAT MS transmits an indicator indicating that the multi-RAT MS supports multi-RAT to the base station via the initial network entry procedure to the base station. Here, the indicator may be a multi-RAT mobile station (MS) capability field. In addition, the indicator, that is, the multi RAT MS capability field may have a size of 1 bit.

The indicator may be transmitted via a registration process performed during the initial network entry procedure to the base station. In this case, the indicator may be transmitted to the base station through a registration request/registration response (REG-REQ/REG-RSP) message.

For example, when the indicator is set to '1', the indicator indicates that the multi-RAT MS supports multi-RAT. When the indicator is set to '0', the indicator indicates that the multi-RAT MS does not support multi-RAT.

In addition, when the base station receives the registration request REG-REQ message or registration response REG-RSP message including the indicator (e.g., an indicator set to '1') indicating that the multi-RAT MS has capability for supporting multi-RAT from the multi-RAT MS, the base station may transmit, to the multi-RAT MS, notification information indicating that a separate multi-RAT capability negotiation procedure for supporting the multi-RAT MS is performed after the initial network entry procedure is completed or a predetermined time elapses.

For example, when the notification information is set to '1', the notification information indicates that the base station and the multi-RAT MS perform the separate multi-RAT capability negotiation procedure in order to support multi-RAT. When the notification information is set to '0', the notification information indicates that the separate multi-RAT capability negotiation procedure does not have to be performed.

Then, when the multi-RAT MS and the base station complete the initial network entry procedure, the multi-RAT MS and the base station perform the multi-RAT capability negotiation procedure (S220). In general, the multi-RAT capability negotiation procedure is performed after a network (re-)entry procedure is completed. However, the multi-RAT capability negotiation procedure may also be performed during the network (re-)entry procedure.

For example, when the multi-RAT capability negotiation procedure is performed during the network (re-)entry procedure, the multi-RAT MS and the base station may perform the multi-RAT capability negotiation procedure via a registration procedure of the base station and the multi-RAT MS. In this case, the multi-RAT MS and the base station may transmit and receive information about multi-RAT capability negotiation through the registration request/registration response (REG-REQ/REG-RSP) message.

The multi-RAT capability negotiation procedure of the multi-RAT MS and the primary system will be described in detail with reference to FIG. 3.

Then, the multi-RAT MS performs an AP scanning procedure for access to the secondary system based on secondary system-rated information received from the base station (S230).

Here, the multi-RAT MS performs a scanning procedure on APs in the vicinity of the MS periodically or in an event-triggered manner in order to access the secondary system. First, it is assumed that data communication of all data transmitted to the multi-RAT MS is performed using a dynamic service (DSx) procedure with the base station of the primary system and communication between the secondary system and the multi-RAT MS is performed by transmitting data of a specific flow to the secondary system based on determination of the base station of the primary system.

In addition, it is assumed that the scanning of the multi-RAT MS on the AP of the secondary system is performed under an instruction of the base station of the primary system, for power saving of the multi-RAT MS.

The AP scanning procedure of the multi-RAT MS for the access to the secondary system may include receiving a multi-RAT scan command message from the base station, performing scanning based on the multi-RAT scan command message, and transmitting a multi-RAT scan report message for reporting a scanning result to the base station.

The scanning procedure for the access to the secondary system of the multi-RAT MS will be described in detail with reference to FIG. 4.

Then, the multi-RAT MS performs a secondary system management (or operating) procedure (S240). Here, the secondary system management procedure refers to a procedure such as access, access release, and access change of the multi-RAT MS to the secondary system. Here, the secondary system management procedure is controlled by the primary system.

The multi-RAT MS accesses the secondary system.

Then, the multi-RAT MS transmits and receives data through the AP of the secondary system.

Here, the multi-RAT MS needs to receive acknowledgement about the access to the secondary system from the primary system in order to access the secondary system.

That is, as described above, the base station selects an AP which the multi-RAT MS accesses, and checks a state of the selected AP prior to transmission of the acknowledgement about the access of the multi-RAT MS to the secondary system to the multi-RAT MS. As the check result, when the selected AP can be accessed, the base station may transmit information about the multi-RAT MS to the selected AP in advance.

When the base station transmits the acknowledgement to the multi-RAT MS, the base station may also transmit necessary or useful information for the access of the multi-RAT MS to the AP.

For example, the necessary or useful information may be subsystem identification (SSID), a media access control (MAC) address of the AP, a wired equivalent privacy (WEP) key, a channel number (i.e., frequency information), a protocol version (11a/b/n . . . ) of the AP, or offset information between a beacon and a frame of the base station (which is transmitted as a difference from a specific frame time that represents a relative position of the beacon).

In addition, as a result of the AP scanning of the multi-RAT MS for the access to the secondary system, when the multi-AP MS recognizes that the multi-AP MS enters the coverage of the secondary system, the multi-RAT MS may request the base station of the primary system for the access to the secondary system.

The secondary system management procedure may include the following messages.

1. A secondary system request (SS_REQ) message
: which is used for the multi-RAT MS to request access to the AP.

2. A secondary system command (SS_CMD) message
: which is a message used to manage the access to the AP and is used for access, access release, and access change to the AP.

3. A secondary system indicate (SS_IND) message
: which is a message used as a response to the secondary system command message and is used for the multi-RAT MS to inform the base station about success in access, success in access release, and success in access change to the AP.

Then, when the access to the AP of the secondary system is successful, the multi-RAT MS may transmit and receive data to and from the primary system and may transmit data to and from the secondary system at one time. Here, the data transmitted and received to and from the multi-RAT MS through the AP is controlled by the primary system.

Multi-RAT Capability Negotiation Procedure

Hereinafter, the multi-RAT capability negotiation procedure between the multi-RAT MS and the base station will be described in detail.

Figure 3:
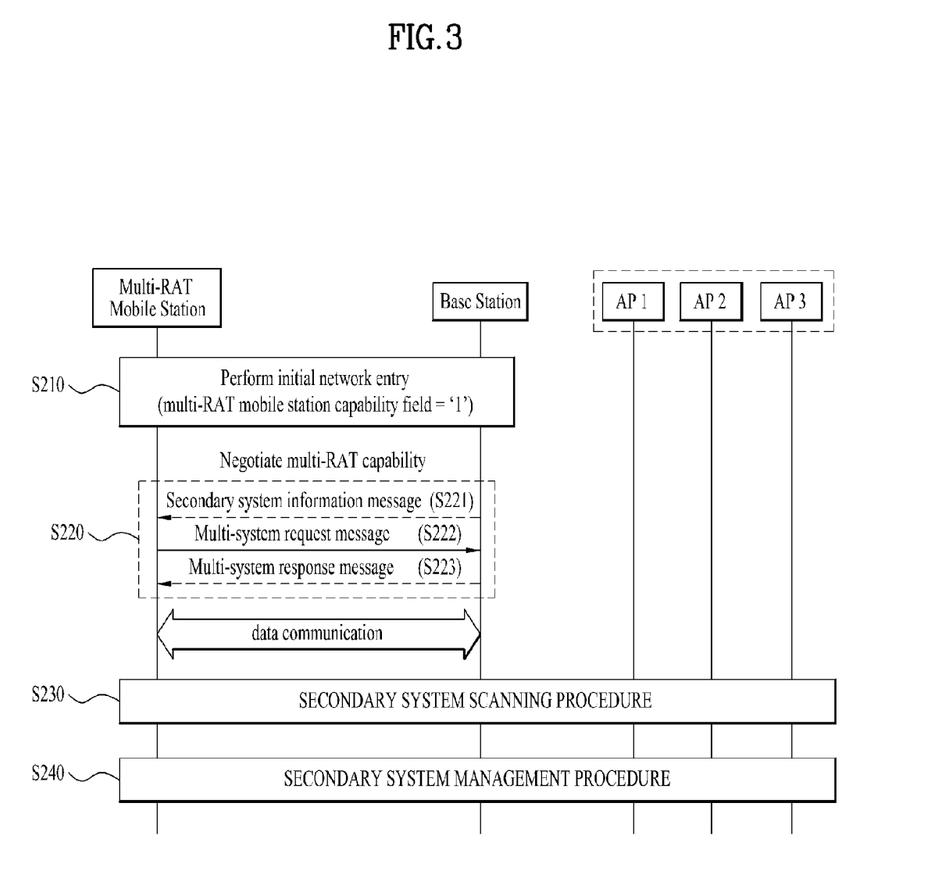
FIG. 3 is a flowchart of a multi-RAT capability negotiation procedure between a multi-RAT MS and a primary system, according to an embodiment of the present invention.

FIG. 3 is a flowchart of a multi-RAT capability negotiation procedure between a multi-RAT MS and a primary system, according to an embodiment of the present invention.

Operations S210, S230, and S240 are the same as in FIG. 2, and thus, a detailed description thereof will be omitted. Only operation S220 that is different from FIG. 2 will be described in detail.

As described above, the multi-RAT capability negotiation procedure between the multi-RAT MS and the base station is performed after a network (re-)entry procedure is completed.

Here, with regard to the network re-entry procedure, the multi-RAT capability negotiation procedure may be omitted. This is because the multi-RAT capability has already been negotiated through the initial network entry procedure between the multi-RAT MS and the base station. Thus, when the multi-RAT MS re-enters a network of the same system, if the multi-RAT MS performs the same procedure, unnecessary overhead is created.

In addition, during handover (HO), a target base station of the primary system may negotiate with the multi-RAT MS for the multi-RAT capability in advance through a backbone network from a serving base station of the primary system.

The multi-RAT MS may perform the multi-RAT capability negotiation procedure with the primary system using the following method.

First, the base station may transmit secondary system-related information to the multi-RAT MS (S221). That is, when there is common information about APs of the secondary system, which needs to be received by the multi-RAT MS, the base station may transmit the AP information to the multi-RAT MS in a broadcast or unicast manner.

The secondary system-related information refers to information about a heterogeneous system within the same coverage as the primary system. Here, the multi-RAT MS may not have to recognize all secondary systems included in the primary system and the secondary system-related information. In this case, the base station may not transmit all information about secondary systems included in the primary system and the secondary system-related information and may transmit only a list of information related (or necessary) to the multi-RAT MS to the multi-RAT MS in a unicast manner. In this case, the list may be transmitted in the multi-RAT capability negotiation procedure.

Then, the multi-RAT MS transmits a multisystem capability request message to the base station (S222). The multisystem capability request message may include, for example, an 802.11 MAC address of the multi-RAT MS, existing access AP information, 802.11 protocol version information, or the like. The 802.11 MAC address is required for authentication information. When the existing access AP information is included in the multisystem capability request message, the multisystem capability request message is transmitted only to a base station to which an existing access AP belongings.

Then, the base station transmits a multisystem capability response message to the multi-RAT MS in response to the multisystem capability request message (S223). The multisystem capability response message may include information about candidate APs.

When the multi-RAT MS enters an idle mode, the base station may store information obtained through the multi-RAT capability negotiation procedure with the multi-RAT MS for a predetermined period of time. That is, a new period of time is defined by a multi-RAT information latch timer. The obtained information may be stored until the time set by the multi-RAT information latch timer elapses. After the time elapses, the obtained information may be discarded.

Before the time set by the multi-RAT information latch timer elapses, when the multi-RAT MS re-enters the network of the base station, the multi-RAT capability negotiation procedure may be omitted.

Secondary System Scanning Procedure

Hereinafter, a scanning procedure of the secondary system of the multi-RAT MS will be described in detail.

Figure 4:
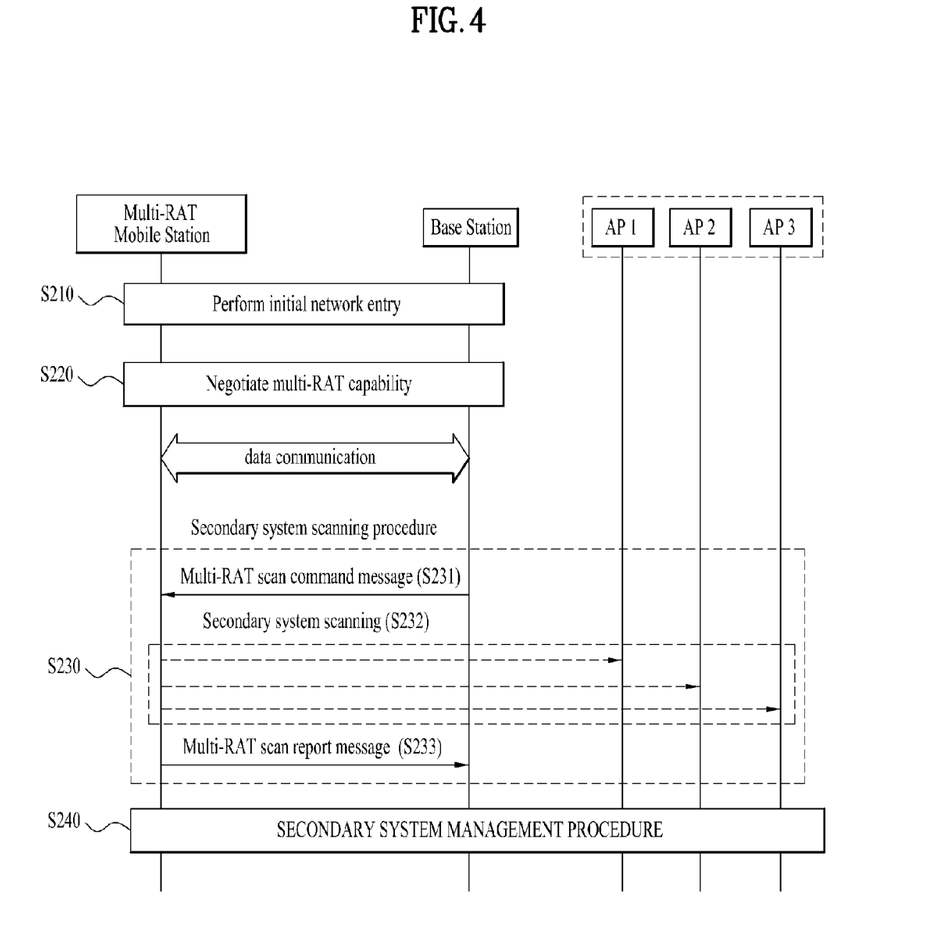
FIG. 4 is a flowchart of a scanning procedure on a secondary system of a multi-RAT MS according to an embodiment of the present invention.

FIG. 4 is a flowchart of a scanning procedure of a secondary system of a multi-RAT MS according to an embodiment of the present invention.

Operations S210, S220, and S240 are the same as in FIG. 2, and thus, a detailed description thereof will be omitted. Only operation S230 that is different from in FIG. 2 will be described in detail.

First, when the base station determines that a specific data flow needs to be transmitted and received using WiFi, the base station commands the multi-RAT MS to scan APs in the vicinity of the MS. That is, the base station transmits a multi-RAT scan command message (Multi-RAT_SCN-CMD message) to the multi-RAT MS (S231). In this case, the multi-RAT scan command message may include SSIDs of the APs in the vicinity of the MS, a beacon transmission period, and scanning interval in order for the multi-RAT MS to quickly detect the APs.

Here, in order to perform the scanning procedure, the multi-RAT MS may directly request the base station of the primary system for scanning for access to the secondary system, but not in response to the command of the base station, as described above. In this case, the multi-RAT MS and the base station may perform the scanning procedure on the APs through a probe request/response transmitting/receiving procedure.

Here, the multi-RAT MS may also perform the scanning procedure for the access to the secondary system during data communication with the base station of the primary system. In this case, the multi-RAT MS may indicate only a scan report (SCN-REP) transmission method through a scan command (SCN-CMD) message without setting a scanning interval.

That is, when the multi-RAT MS receives the multi-RAT scan command message from the base station, the multi-RAT MS performs the scanning procedure on the APs in the vicinity of the multi-RAT MS based on information included in the multi-RAT scan command message (S232). Here, the APs in the vicinity of the multi-RAT MS may be APs of the secondary system within the coverage of the base station of the primary system.

Then, the multi-RAT MS transmits a multi-RAT scan report message (MultiRAT_SCN-REP message) to the base station of the primary system (S233). That is, the multi-RAT MS transmits the scanning result of the detected AP to the base station. In this case, the multi-RAT MS may transmit a received signal strength indicator (RSSI) of each AP or preferred AP information of the multi-RAT MS together.

For example, when a scan report mode in a multi-RAT scan command message that is most recently received from the base station is set to '0b10', the multi-RAT MS may transmit the multi-RAT scan report message to the base station using an event-triggered manner.

In this case, when the multi-RAT MS satisfies a scan report trigger condition, the multi-RAT MS transmits the multi-RAT scan report message to the base station.

As another example, the multi-RAT MS may report the scanning result to the base station at a time specified in the multi-RAT scan command message, but not within the scanning interval, for periodic scan report (for example, when a scan report mode is set to '0b01') or one scan report (for example, when the scan report mode is set to '0b11').

When the multi-RAT MS periodically reports the scanning result to the base station, the multi-RAT MS may stop reporting the scanning result of APs after all scanning intervals in the multi-RAT scan command message.

In addition, the multi-RAT scan report message may include all available scanning results of requested APs specified in the multi-RAT scan command message.

The multi-RAT MS may transmit the multi-RAT scan report message to the base station in order to report the scanning result to the base station anytime or to receive system information about a requested system and to selectively receive a multi-RAT neighbor advertising message, which includes system information about other RATs that are determined by the base station to exist in the vicinity of the multi-RAT MS, in a unicast manner.

In addition, the multi-RAT MS may add a neighbor request RAT type indicator and/or SSIDs (or BSSID or MAC address) to the scan report message, and thus, the multi-RAT MS may request the base station to filter a list of neighbor secondary systems in order to filter the list based on a requested wireless type.

Then, when the base station receives scanning results of a plurality of APs from the multi-RAT MS, that is, when the base station receives the multi-RAT scan report message, the base station may select an optimal system, that is, an optimal AP in consideration of the same operator, MS priority, channel quality, load balancing, transmission traffic, or the like, and may inform the multi-RAT MS of the optimal system.

According to another embodiment of the present invention, the multi-RAT MS may use an existing message that is previously transmitted and received, instead of the multi-RAT scan command/report messages defined above in order to perform the scanning procedure on the secondary system. Here, when the multi-RAT MS scans the secondary system using the existing message, the existing message includes information indicating that the scanning procedure of the multi-RAT MS is performed to transmit and receive data using the multi-RAT system. That is, a new field indicating an SSID, BSSID, or MAC address of a target system may be defined in the existing message so as to indicate a scanning object of the multi-RAT MS.

Then, the multi-RAT MS accesses the secondary system and then transmit and receive data to and from the secondary system. Here, access, access release, and access change to the secondary system may correspond to operation (or management) of the secondary system. In addition, the primary system may control the operation of the secondary system.

Here, in order to access the secondary system, the multi-RAT MS needs to receive acknowledgement about the access to the secondary system from the primary system.

That is, as described above, the base station selects an AP which the multi-RAT MS accesses, and checks a state of the selected AP prior to transmission of the acknowledgement about the access to the secondary system to the multi-RAT MS. As the check result, when the selected AP can be accessed, the base station may transmit information about the multi-RAT MS to the selected AP in advance.

When the base station transmits the acknowledgement to the multi-RAT MS, the base station may also transmit necessary or useful information for the access of the multi-RAT MS to the AP.

For example, the necessary or useful information may be SSID, a MAC address of the AP, a WEP Key, a channel number (i.e., frequency information, a protocol version (11a/b/n . . . ) of the AP, or offset information between a beacon and a frame of the base station (which is transmitted as a difference from a specific frame time that represents a relative position of the beacon).

In addition, as a result of the AP scanning of the multi-RAT MS for the access to the secondary system, when the multi-AP MS recognizes that the multi-AP MS enters the coverage of the secondary system, the multi-RAT MS may request the base station of the primary system for the access to the secondary system.

The above-described embodiments and modified embodiments may be combined with each other, and thus, may be used alone or in combination thereof, if necessary. The combination may be easily implemented by one of ordinary skill in the art, and thus, a detailed description thereof will not be given here. Although not described, it is to be appreciated that the combination is not precluded, and is within the scope of the invention.

The embodiments of the present invention may be achieved by various means, for example, hardware, firmware, software, or a combination thereof.

In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

For example, the methods according to the present invention may be stored in a storage medium (e.g., an internal memory, a flash memory, a hard disk, etc.) and may be implemented as code or commands in a software program that can be executed by a processor (e.g., a microprocessor), which will be described with reference to FIG. 5.

Figure 5:
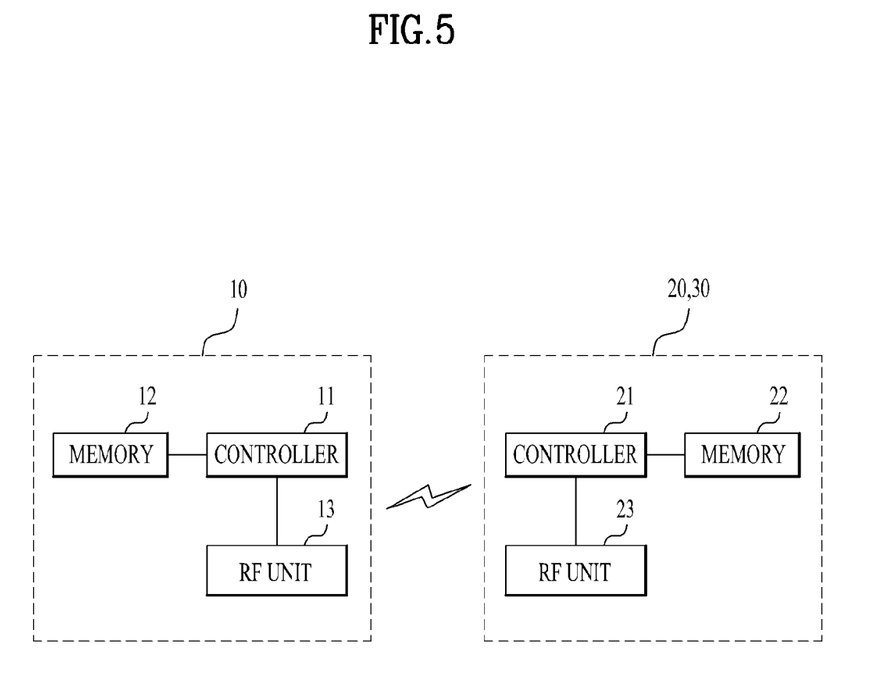
FIG. 5 is an internal block diagram of an MS and base stations in a radio access system to which an embodiment of the present invention can be applied.

FIG. 5 is an internal block diagram of an MS 10 and base stations 20 and 30 in a radio access system to which an embodiment of the present invention can be applied.

The MS 10 includes a controller 11, a memory 12, and a radio frequency (RF) unit 13.

The MS 10 may be fixed or mobile and may be referred to as other terms such as user equipment (UE), user terminal (UT), subscriber station (SS), wireless device, and advance mobile station (AMS). In addition, the MS 10 includes the multi-RAT MS.

The MS 10 includes a display unit, a user interface unit, or the like.

The controller 11 implements proposed functions, procedures, and/or methods. Layers of a wireless interface protocol may be implemented by the controller 11.

The memory 12 is connected to the controller 11 and stores protocols or parameters for wireless communication. That is, the memory 12 stores an MS driving system, applications, and general files.

The RF unit 13 is connected to the controller 11 and transmits and/or receives an RF signal.

In addition, the display unit may display various information of the MS 10 and may use a well known element such as a liquid crystal display (LCD), an organic light emitting diode (OLED), or the like. The user interface unit may include a combination of well known user interfaces such as keypads, touchscreens, or the like.

The base stations 20 and 30 include a controller 21, a memory 22, and an RF unit 23.

Here, in general, the base stations 20 and 30 may each be fixed stations that communicate with the MS 10 and may be referred to as other terms such as NodeB, base transceiver system (BTS), access point, or the like. One or more cells may exist in one base station.

The controller 21 implements proposed functions, procedures, and/or methods. Layers of a wireless interface protocol may be implemented by the controller 21.

The memory 22 is connected to the controller 21 and stores protocols or parameters for wireless communication.

The RF unit 23 is connected to the controller 21 and transmits and/or receives an RF signal.

The controllers 11 and 21 may each include an application-specific integrated circuit (ASIC), other chipsets, a logical circuit, and/or a data processor. The memories 12 and 22 may include a read-only memory (ROM), a random access memory (RAM), a flash memory, a memory card, a storage medium, and/or other storage devices. The RF units 13 and 23 may each include a baseband circuit for processing an RF signal. When the embodiments of the present invention are implemented in the form of software, the above-described methods may be implemented in the form of a module (a procedure, a function, etc.) for performing the above-described functions. The module may be stored in the memories 12 and 22 and may be executed by the controllers 11 and 21.

The memories 12 and 22 may be located inside or outside the controllers 12 and 22 and may be connected to the controllers 11 and 21 via various well known means.

The terminology used herein is for the purpose of describing particular embodiments only and is not intended to be limiting of the present invention. Unless otherwise defined, all technical terms used herein have the same meaning as commonly understood by one of ordinary skill in the art to which this present invention pertains and will not be interpreted in overly wide or narrow sense unless expressly so defined herein. If a term used herein is a wrong term by which one of ordinary skill in the art cannot correctly understand the present invention, the wrong term should be replaced by a technical term by which one of ordinary skill in the art can correctly understand the present invention. It will be further understood that terms, such as those defined in commonly used dictionaries, should be interpreted as having a meaning that is consistent with their meaning in the context of the relevant art and will not be interpreted in an overly narrow sense.

As used herein, the singular forms "a," "an" and "the" are intended to include the plural forms as well, unless the context clearly indicates otherwise. It will be further understood that the terms "comprises" or "comprising" are not intended to included all elements or all steps described herein, but do not preclude exclusion of some elements or steps described herein or addition of one or more other elements or steps.

It will be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements present.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The invention claimed is:

1. A method for transmitting and receiving data to and from a primary base station supporting a primary radio access technology (RAT) and a secondary base station supporting a secondary RAT by a mobile station (MS) in a radio access system supporting a multi-RAT, the method comprising:
   executing an initial network entry procedure with the primary base station;
   performing a multi-RAT capability negotiation procedure with the primary base station, the multi-RAT capability negotiation procedure including exchanging information required for an additional access to the secondary base station;
   receiving, from the primary base station, a multi-RAT scan command message that commands the MS to perform a scanning procedure on at least one secondary base station within coverage of the primary base station, the multi-RAT scan command message including SSIDs (subsystem identifications) of secondary base stations in vicinity of the MS, a beacon transmission period, and a scanning interval;
   performing the scanning procedure on the at least one secondary base station based on the information exchanged with the primary base station through the multi-RAT capability negotiation procedure;
   if an acknowledgement message allowing the MS to additionally access a selected secondary base station is received from the primary base station, performing an additional access procedure with the selected secondary base station to simultaneously connect to both of the primary base station and the selected secondary base station,
   wherein the acknowledgement message is received with a SSID of the selected secondary base station, a MAC (medium access control) address of the selected secondary base station, a WEP (wired equivalent privacy) key, a channel number, a protocol version of the selected secondary base station and an offset between a beacon and a frame of the selected secondary base station,
   wherein the selected secondary base station is selected by the primary base station based on:
      whether or not an operator of the second base station is the same as an operator of the primary base station,
      channel quality,
      load balancing, and
      traffic; and
   simultaneously transmitting and receiving data to and from the primary base station and the selected secondary base station.

2. The method according to claim 1, wherein the performing of the scanning procedure further comprises transmitting a multi-RAT scan report message for report of a result of the scanning procedure to the primary base station.

3. The method according to claim 2, further comprising receiving information about the secondary base station selected based on the multi-RAT scan report message, from the primary base station.

4. The method according to claim 1, wherein the performing of the scanning procedure is performed periodically, in an event-triggered manner, or only once.

5. The method according to claim 1, wherein the primary RAT is a broadband RAT, and the secondary RAT is a local area RAT.

6. The method according to claim 1, wherein the primary base station and the secondary base station are connected to each other in a wired or wireless manner.

7. The method according to claim 1, wherein a type of a data flow transmitted and received through the secondary base station is determined according to an instruction of the primary base station.

8. The method according to claim 2, wherein the multi-RAT scan report message comprises a received signal strength indicator (RSSI) of the AP and/or preferred AP information of the MS.

9. A mobile station (MS) for transmitting and receiving data to and from a primary base station supporting a primary radio access technology (RAT) and a secondary base station supporting a secondary RAT in a radio access system supporting a multi-RAT, the MS comprising:
   a radio frequency (RF) unit configured to transmit and receive a RF signal to and from an external source; and
   a controller connected to the RF unit and configured to:
      execute an initial network entry procedure with the primary base station;
      perform a multi-RAT capability negotiation procedure with the primary base station, the multi-RAT capability negotiation procedure including exchanging information required for an additional access to the secondary base station;
      receive, from the primary base station, a multi-RAT scan command message that commands the MS to perform a scanning procedure on at least one secondary base station within coverage of the primary base station, the multi-RAT scan command message including SSIDs (subsystem identifications) of secondary base stations in vicinity of the MS, a beacon transmission period, and a scanning interval;
      perform the scanning procedure on the at least one secondary base station based on the information exchanged with the primary base station through the multi-RAT capability negotiation procedure;
      if an acknowledgement message allowing the MS to additionally access a selected secondary base station is received from the primary base station, perform an additional access procedure with the selected secondary base station to simultaneously connect to both of the primary base station and the selected secondary base station, wherein the acknowledgement message is received with a SSID of the selected secondary base station, a MAC (medium access control) address of the selected secondary base station, a WEP (wired equivalent privacy) key, a channel number, a protocol version of the selected secondary base station and an offset between a beacon and a frame of the selected secondary base station, wherein the selected secondary base station is selected by the primary base station based on:
whether or not an operator of the second base station is the same as an operator of the primary base station,
channel quality,
load balancing, and
traffic; and simultaneously transmit and receive data to and from the primary base station and the selected secondary base station.

10. The method according to claim 1, wherein the exchanged information is valid for a period of a multi-RAT information maintenance timer.

11. The mobile station (MS) according to claim 9, wherein the exchanged information is valid for a period of a multi-RAT information maintenance timer.

* * * * *